United States Patent
Gassend et al.

(10) Patent No.: US 12,392,990 B2
(45) Date of Patent: Aug. 19, 2025

(54) MIRROR COUPLING

(71) Applicant: Waymo LLC, Mountain View, CA (US)

(72) Inventors: Blaise Gassend, East Palo Alto, CA (US); Ryan Davis, Woodside, CA (US); David Duff, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/415,819

(22) Filed: Jan. 18, 2024

(65) Prior Publication Data

US 2024/0151934 A1  May 9, 2024

Related U.S. Application Data

(63) Continuation of application No. 17/896,814, filed on Aug. 26, 2022, now Pat. No. 11,906,813, which is a
(Continued)

(51) Int. Cl.
*G02B 7/00* (2021.01)
*G01S 7/481* (2006.01)
(Continued)

(52) U.S. Cl.
CPC .......... *G02B 7/1821* (2013.01); *G01S 7/4817* (2013.01); *G01S 17/06* (2013.01);
(Continued)

(58) Field of Classification Search
CPC ...... G02B 7/1821; G02B 6/26; G02B 26/105; G02B 7/008; G02B 26/004; G02B 26/005;
(Continued)

(56) References Cited

U.S. PATENT DOCUMENTS 9,618,742 B1 * 4/2017 Droz ................. G02B 26/12
9,778,364 B2 * 10/2017 Gruver ................. G01C 3/02
(Continued)

OTHER PUBLICATIONS

International Searching Authority, International Search Report and Written Opinion dated Feb. 13, 2020, issued in connection with International Patent Application No. PCT/US2019/057776, filed on Oct. 24, 2019, 12 pages.

*Primary Examiner* — Henry Duong
(74) *Attorney, Agent, or Firm* — MCDONNELL BOEHNEN HULBERT & BERGHOFF LLP (57) ABSTRACT

The present disclosure relates to optical devices and systems, specifically those related to light detection and ranging (LIDAR) systems. An example device includes a shaft defining a rotational axis. The shaft includes a first material having a first coefficient of thermal expansion. The device also includes a rotatable mirror disposed about the shaft. The rotatable mirror includes a multi-sided structure having an exterior surface and an interior surface. The multi-sided structure includes a second material having a second coefficient of thermal expansion. The second coefficient of thermal expansion is different from the first coefficient of thermal expansion. The multi-sided structure also includes a plurality of reflective surfaces disposed on the exterior surface of the multi-sided structure. The multi-sided structure yet further includes one or more support members coupled to the interior surface and the shaft.

20 Claims, 10 Drawing Sheets

Related U.S. Application Data continuation of application No. 16/232,323, filed on Dec. 26, 2018, now Pat. No. 11,460,662.

(60) Provisional application No. 62/754,800, filed on Nov. 2, 2018.

(51) Int. Cl.
  *G01S 17/06* (2006.01)
  *G02B 6/26* (2006.01)
  *G02B 7/182* (2021.01)
  *G02B 26/10* (2006.01)
  *H01S 3/081* (2006.01)

(52) U.S. Cl.
  CPC .............. *G02B 6/26* (2013.01); *G02B 26/105* (2013.01); *H01S 3/0811* (2013.01)

(58) Field of Classification Search
  CPC .............. G02B 26/007; G02B 26/0825; G02B 26/0866; G01S 7/4817; G01S 17/06; G01S 17/42; H01S 3/0811
  USPC ...................................................... 359/224.1
  See application file for complete search history.

(56) References Cited

U.S. PATENT DOCUMENTS

| | | |
|---|---|---|
| 9,810,776 B2 | 11/2017 | Sapir |
| 9,823,351 B2 | 11/2017 | Haslim et al. |
| 9,864,164 B2 | 1/2018 | Itami et al. |
| 10,042,042 B2 | 8/2018 | Miremadi |
| 11,460,662 B2 | 10/2022 | Gassend et al. |
| 11,906,813 B2 | 2/2024 | Gassend et al. |
| 2011/0164783 A1 | 7/2011 | Hays et al. |
| 2015/0096181 A1 | 4/2015 | Plangger et al. |
| 2015/0355327 A1 | 12/2015 | Goodwin et al. |
| 2016/0047902 A1 | 2/2016 | Ishikawa et al. |
| 2017/0168261 A1 | 6/2017 | Itami et al. |
| 2018/0231644 A1 | 8/2018 | Gassend et al. |
| 2018/0269647 A1 | 9/2018 | Choiniere et al. |
| 2018/0341020 A1* | 11/2018 | Magee .................... G01S 17/42 |

* cited by examiner

MIRROR COUPLING

CROSS-REFERENCE TO RELATED APPLICATIONS

The present application is a continuation of U.S. patent application Ser. No. 17/896,814, filed Aug. 26, 2022, which is a continuation of U.S. patent application Ser. No. 16/232,323, filed Dec. 26, 2018, which claimed the benefit of U.S. Patent Application No. 62/754,800, filed Nov. 2, 2018. The foregoing applications are incorporated herein by reference.

BACKGROUND

Unless otherwise indicated herein, the materials described in this section are not prior art to the claims in this application and are not admitted to be prior art by inclusion in this section.

Light detection and ranging (LIDAR) systems utilize light to provide information about objects in an environment. For example, LIDAR systems can provide map data about a physical environment. Some LIDAR systems include a scanning assembly configured to direct the light around the environment. Such scanning assemblies may include one or more moving mirrors.

SUMMARY

The present disclosure generally relates to an optical system with a moving mirror assembly. In some embodiments, the moving mirror assembly may be configured to rotate so as to direct laser light around an environment of the optical system. As described herein, some arrangements of the laser light source and the mirror assembly may provide a broad scanning angle (e.g., greater than 230 degrees) for mapping of objects within a given environment.

In a first aspect, a device is provided. The device includes a shaft defining a rotational axis. The shaft includes a first material having a first coefficient of thermal expansion. The device also includes a rotatable mirror disposed about the shaft. The rotatable mirror includes a multi-sided structure that has an exterior surface and an interior surface. The multi-sided structure includes a second material having a second coefficient of thermal expansion. The second coefficient of thermal expansion is different from the first coefficient of thermal expansion. The device also includes a plurality of reflective surfaces disposed on the exterior surface of the multi-sided structure. The device additionally includes one or more support members. Each support member has a respective first end and a respective second end. The respective first ends of the support members are coupled to the interior surface. The respective second ends of the support members are coupled to the shaft.

In a second aspect, a system is provided. The system includes a light-emitter device and a photodetector. The system additionally includes a rotatable mirror disposed about a shaft defining a rotational axis. The shaft includes a first material having a first coefficient of thermal expansion. The rotatable mirror includes a multi-sided structure that has an exterior surface and an interior surface. The multi-sided structure includes a second material having a second coefficient of thermal expansion. The second coefficient of thermal expansion is different from the first coefficient of thermal expansion. The system includes a plurality of reflective surfaces disposed on the exterior surface of the multi-sided structure. The system yet further includes one or more support members, each support member having a respective first end and a respective second end. The respective first ends of the support members are coupled to the interior surface. The respective second ends of the support members are coupled to the shaft. The system also includes a controller that executes instructions so as to carry out operations. The operations include causing the rotatable mirror to rotate about the rotational axis. The operations also include causing the light-emitter device to emit light pulses toward at least one reflective surface such that at least a portion of the light pulses interact with an external environment to form reflected light pulses.

In a third aspect, a light detection and ranging (LIDAR) system is provided. The LIDAR system includes a shaft formed from a first material having a first coefficient of thermal expansion. The LIDAR system includes a rotatable structure comprising an exterior surface and an interior surface. The rotatable structure is formed from a second material having a second coefficient of thermal expansion. The LIDAR system includes one or more elastic support members that couple the shaft to the interior surface of the rotatable structure. The elastic support members are configured to accommodate a thermal expansion or contraction between the shaft and the rotatable structure.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A LIDAR system may include a spinning mirror configured to interact with light pulses emitted by one or more light emitters (e.g., laser diodes) so as to direct them toward various locations within an environment. Furthermore, the spinning mirror may be configured to direct light pulses toward one or more photodetectors after such light pulses have interacted with the environment to form return light pulses.

In some embodiments, the LIDAR system may include a laser light source configured to illuminate a mirror along a first axis. The mirror may be configured to rotate about a second axis, in which the second axis is perpendicular or substantially perpendicular to the first axis. In an example embodiment, the mirror may include three mirror surfaces arranged in an equilateral triangle arrangement. While rotating about the second axis, the mirror may be configured to direct the light from the laser light source into an environment of the system over a wide field of view (e.g., greater than 230 degrees about the second axis). By directing the light over this large angular field of view, the LIDAR system may provide ranging information about objects within a large three-dimensional volume.

In some embodiments, the mirror may include a three-sided mirror surface that is coupled to a shaft. The shaft could be made of steel and may be configured to rotate such that the three-sided mirror surface can rotate about the shaft's axis. In some embodiments, the mirror could include an injection-molded plastic (e.g., polycarbonate) body. In such scenarios, the three-sided mirror surface could include one or more deposited materials, such as gold, silicon oxide, titanium oxide, titanium, platinum, or aluminum.

Deformations in a surface of the mirror are undesirable because light pulses could be diverted to irregular and/or unknown positions within the environment. Furthermore, mismatches in the coefficient of thermal expansion (CTE) between the mirror body (e.g., plastic) and the shaft (e.g., steel) could introduce undesirable temperature-dependent deformations that could change dynamically.

In some embodiments, the body of the mirror could be substantially hollow so as to reduce deformation issues related to the CTE mismatch between the shaft and the mirror. For example, the three-sided mirror surface could be coupled to the shaft via a plurality of flexible members (e.g., three members extending toward a shaft from each apex of the three-sided mirror surface. The flexible members could be straight or curved. In some embodiments, the flexible members could be substantially stiff when in torsion, but elastic along the radial axis. In some embodiments, the body of the mirror could be substantially hollow except for one side, where it may be held by a relatively flexible attachment structure.

II. Example Devices and Systems

Figure 1:
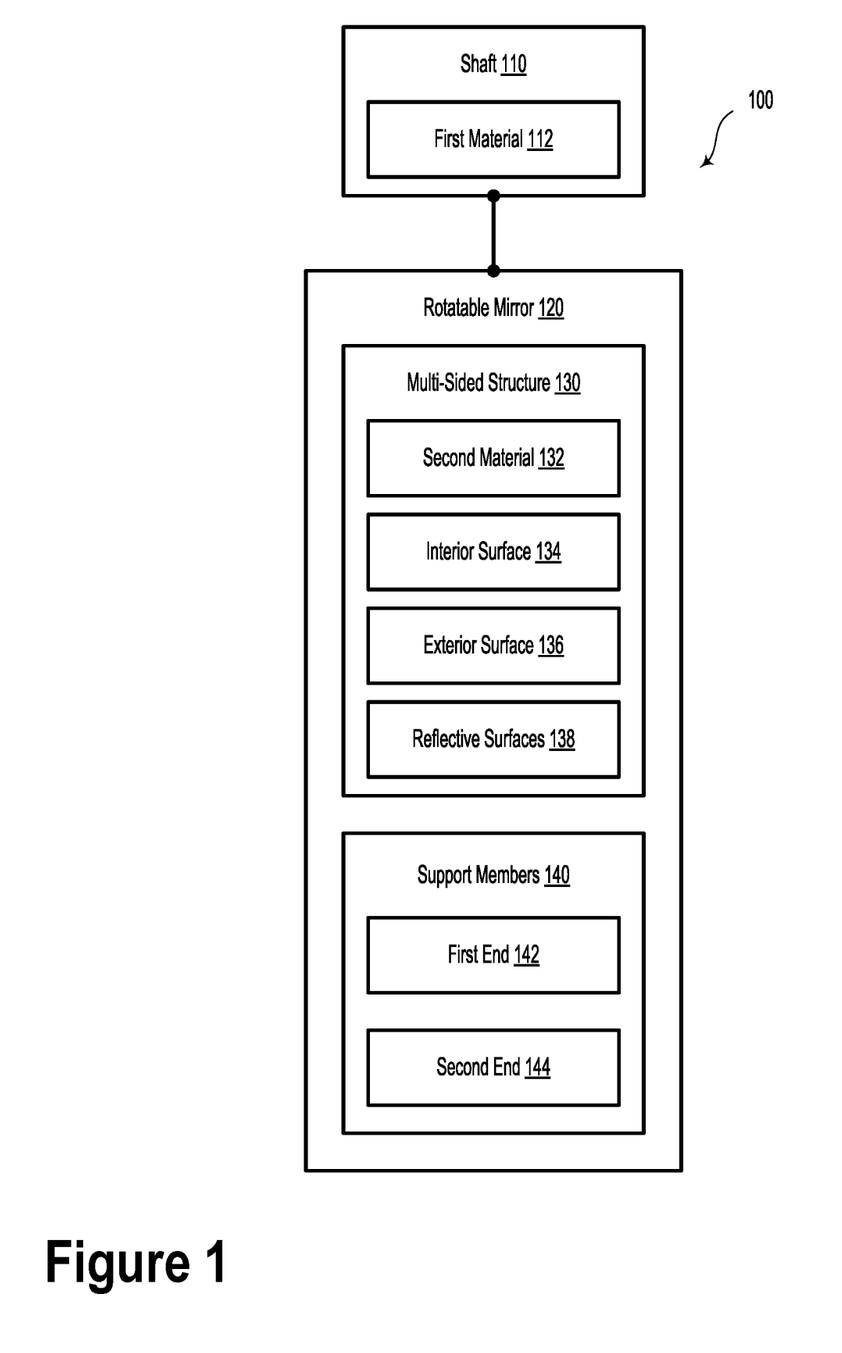
FIG. 1 illustrates a device, according to an example embodiment.

FIG. 1 illustrates a device 100, according to an example embodiment. The device 100 includes a shaft 110 defining a rotational axis. In some embodiments, the shaft 110 could include a straight shaft section with a diameter of 2 millimeters. However, other shaft diameters (e.g., 1-5 millimeters, or greater) are possible and contemplated. The shaft 110 includes a first material 112 having a first coefficient of thermal expansion. In some embodiments, the first material 112 includes steel. However, other materials, such as aluminum, brass, copper, ceramic, composite materials, and/or other rigid materials are possible and contemplated.

The device 100 also includes a rotatable mirror 120 disposed about the shaft 110. The rotatable mirror 120 includes a multi-sided structure 130. In example embodiments, the multi-sided structure 130 could be shaped like a triangular prism with a central hollow portion or cavity. For example, the multi-sided structure 130 could include an exterior surface 136 and an interior surface 134. The multi-sided structure 130 could be formed, at least in part, with a second material 132 having a second coefficient of thermal expansion. In some embodiments, the second material 132 includes polycarbonate. However, in other embodiments, the second material 132 could include other plastic materials (e.g., ZEONEX Cyclo Olefin Polymer (COP), polyethylene terephthalate (PET), polyethylene (PE), polyvinyl chloride (PVC), polypropylene (PP), polystyrene (PS), polylactic acid (PLA), or acrylic (PMMA), etc.), ceramic materials, or other materials that are different from the first material 112. The second coefficient of thermal expansion is different than (e.g., greater than) the first coefficient of thermal expansion.

The device 100 includes a plurality of reflective surfaces 138 disposed on the exterior surface 136 of the multi-sided structure 130. As an example, the plurality of reflective surfaces 138 may include three reflective surfaces arranged symmetrically about a rotational axis such that the rotatable mirror 120 has a triangular prism shape.

The device 100 additionally includes one or more support members 140. Each support member of the plurality of support members 140 has a respective first end 142 and a respective second end 144. The respective first ends 142 of the support members 140 are coupled to the interior surface 134. The respective second ends 144 of the support members 140 are coupled to the shaft 110. In some embodiments, the support members 140 are configured to accommodate a temperature-dependent material expansion or contraction between the shaft 110 and the multi-sided structure 130.

In some embodiments, the interior surface 134 of the multi-sided structure 130 comprises a plurality of angled surfaces having a plurality of corresponding apexes, wherein the respective second ends 144 of the support members 140 are coupled to respective apexes.

In some embodiments, the support members 140 are configured to maintain a temperature-independent flatness of the plurality of reflective surfaces 138 within ±1 micron, within ±10 microns, or within another flatness range.

In some embodiments, the support members 140 could be straight. Additionally or alternatively, the support members 140 could be curved.

In examples, the exterior surface 136 of the multi-sided structure 130 could have a triangular cross-section. In such scenarios, the plurality of reflective surfaces 138 could include three reflective surfaces. The reflective surfaces 138 could include a reflective material, such as titanium, platinum, or aluminum. Other types of reflective materials are possible. In some example embodiments, the reflective surfaces 138 could be coated with a dielectric coating (e.g., a high-reflectivity coating or an anti-reflective coating), such as a Bragg stack or a wavelength selective coating. Other types of coatings are possible.

The multi-sided structure 130 could include a hollow portion. In such scenarios, the shaft 110 could be disposed so as to pass through the hollow portion.

Figure 2:
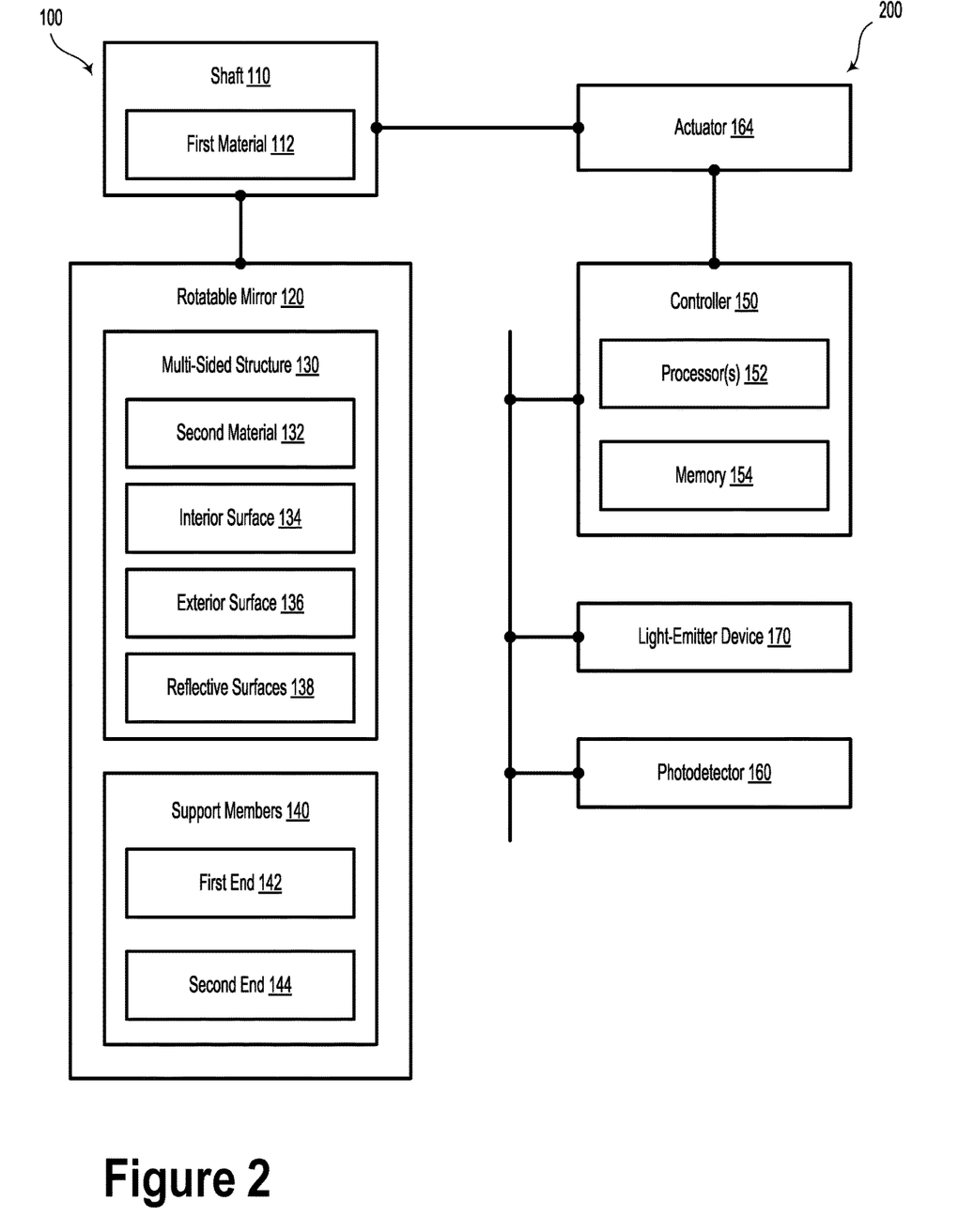
FIG. 2 illustrates a system, according to an example embodiment.

FIG. 2 illustrates a system 200, according to an example embodiment. System 200 includes one or more light-emitter devices 170 and one or more photodetectors 160. The light-emitter device 170 may be operable to emit light. The light-emitter device 170 could be any source of light configured to provide substantially collimated and/or coherent light. For instance, the light-emitter device 170 could be a semiconductor waveguide laser, a fiber laser, an excimer laser, a light-emitting diode, or another type of light-emitter device.

In some embodiments, the light emitted from the light-emitter device 170 may include pulses (and/or pulse trains) of laser light. For instance, the light pulses may have durations in the 1-100 nanosecond range. However, other light pulse durations are possible.

In examples, light emitted by the light-emitter device 170 may have an emission wavelength within the infrared (IR) wavelength range, however other wavelengths are contemplated. For example, the emission wavelength could be in the visible wavelength spectrum or the ultraviolet (UV) wavelength spectrum. In an example embodiment, the emission wavelength may be about 905 nanometers. Alternatively, the emission wavelength could be about 1.55 microns.

In some embodiments, the photodetector(s) 160 could include one or more single photon avalanche detectors (SPADs). Additionally or alternatively, the photodetector(s) 160 may include other types of sensors configured to detect light, such as avalanche photodetectors.

System 200 could also include some or all of the elements of device 100. For example, system 200 could include a rotatable mirror 120 disposed about a shaft 110 defining a rotational axis. The shaft includes a first material 112 having a first coefficient of thermal expansion. In such scenarios, the rotatable mirror 120 includes a multi-sided structure 130 having an exterior surface 136 and an interior surface 134. For example, the multi-sided structure 130 could include a second material 132 having a second coefficient of thermal expansion. In some examples, the second coefficient of thermal expansion is greater than the first coefficient of thermal expansion.

Device 100 and/or system 200 could form at least a portion of a LIDAR system for an autonomous vehicle, such as a self-driving car or an autonomous aerial vehicle.

As described elsewhere herein, the first material 112 could include steel. The second material 132 includes polycarbonate. Other materials are possible and contemplated.

System 200 also includes a plurality of reflective surfaces 138 disposed on the exterior surface 136 of the multi-sided structure 130. The system 200 additionally includes one or more support members 140, each support member having a respective first end 142 and a respective second end 144. In such scenarios, the respective first ends 142 of the support members 140 are coupled to the interior surface 134. Additionally, the respective second ends 144 of the support members 140 are coupled to the shaft 110.

In some embodiments, the shaft 110 could be coupled to an actuator 164. The actuator 164 could include a device configured to rotate the shaft 110, such as a stepper motor, a brushed or brushless DC motor, or another type of rotational actuator. That is, other types of actuators configured to convert electrical energy to an application of rotational mechanical energy to the shaft 110 are contemplated and possible.

Additionally, system 200 includes a controller 150. In example embodiments, the controller 150 may include one or more logic blocks, a programmable logic device (PLD), a field programmable gate array (FPGA), and/or an application-specific integrated circuit (ASIC). Other types of controller circuits are contemplated in the present disclosure. In some embodiments, the controller 150 may include one or more processors 152 and a memory 154. In such scenarios, the processor(s) 152 may be configured to execute instructions stored in the memory 154 so as to carry out operations.

The operations include causing the rotatable mirror 120 to rotate about the rotational axis. In some embodiments, causing the rotatable mirror 120 to rotate could include controlling the actuator 164 to rotate the shaft 110, which is coupled to the rotatable mirror 120.

As an example, the rotatable mirror 120 may rotate about a rotational axis at rotational frequency $\Omega$. In some embodiments, the rotatable mirror 120 may rotate about its rotational axis at a rotational frequency of about 30 kRPM. Other rotational frequencies of rotatable mirror 120 are possible. For example, the rotatable mirror 120 may rotate about its rotational axis within a rotational frequency range between 100 RPM and 100 kRPM.

The operations also include causing the light-emitter device 170 to emit light pulses toward at least one reflective surface 138 such that at least a portion of the light pulses interact with an external environment so as to form reflected light pulses. In some embodiments, the emitted light pulses may have a beam width, such as 2 millimeters. Other beam widths are possible.

In some embodiments, the operations also include, based on receiving, with the photodetector 160, the reflected light pulses from the external environment by way of the at least one reflective surface 138, determining at least one of: a point cloud, a range, or a distance.

In some scenarios, the support members 140 could be configured to accommodate a temperature-dependent material expansion or contraction between the shaft 110 and the multi-sided structure 130.

In some cases, the interior surface 134 of the multi-sided structure 130 could include a plurality of angled surfaces having a plurality of corresponding apexes (e.g., regions of the multi-sided structure 130 where adjacent sidewalls join one another). The respective second ends 144 of the support members 140 are coupled to respective apexes.

The support members 140 could be configured to maintain a temperature-independent flatness of the plurality of reflective surfaces 138 within ±10 microns. Furthermore, in some embodiments, the support members 140 could be straight. Additionally or alternatively, the support members 140 could be curved.

In some embodiments, the exterior surface 136 of the multi-sided structure 130 could have a triangular cross-section. In such a scenario, the plurality of reflective surfaces 138 could include three reflective surfaces 138. As described herein, the reflective surfaces 138 could be formed from at least one of: titanium, platinum, or aluminum. However, other materials are contemplated and possible.

In examples, the reflective surfaces 138 may be configured to reflect light at, or substantially at, the emission wavelength. For example, the reflective surfaces 138 may reflect more than 90% of incident light having an emission wavelength of 1.55 microns. In some embodiments, the reflective surfaces 138 may be formed from, and/or coated with, a metal, such as aluminum, gold, silver, or another reflective material.

Additionally or alternatively, the reflective surfaces 138 may include a high reflectance (HR) coating. In an example embodiment, the HR coating may include a dielectric stack configured to reflect incident light at the emission wavelength. The dielectric stack may include, for example, a periodic layer system alternating between two materials having different indices of refraction. Other types of HR coatings are possible and contemplated herein.

In some cases, the multi-sided structure 130 could include a hollow portion. In such scenarios, the shaft 110 could be disposed so as to pass through the hollow portion. In some embodiments, the shaft 110 could pass completely through the multi-sided structure 130 and be coupled to a housing by way of one or more sets of rotational bearings.

Figure 3:
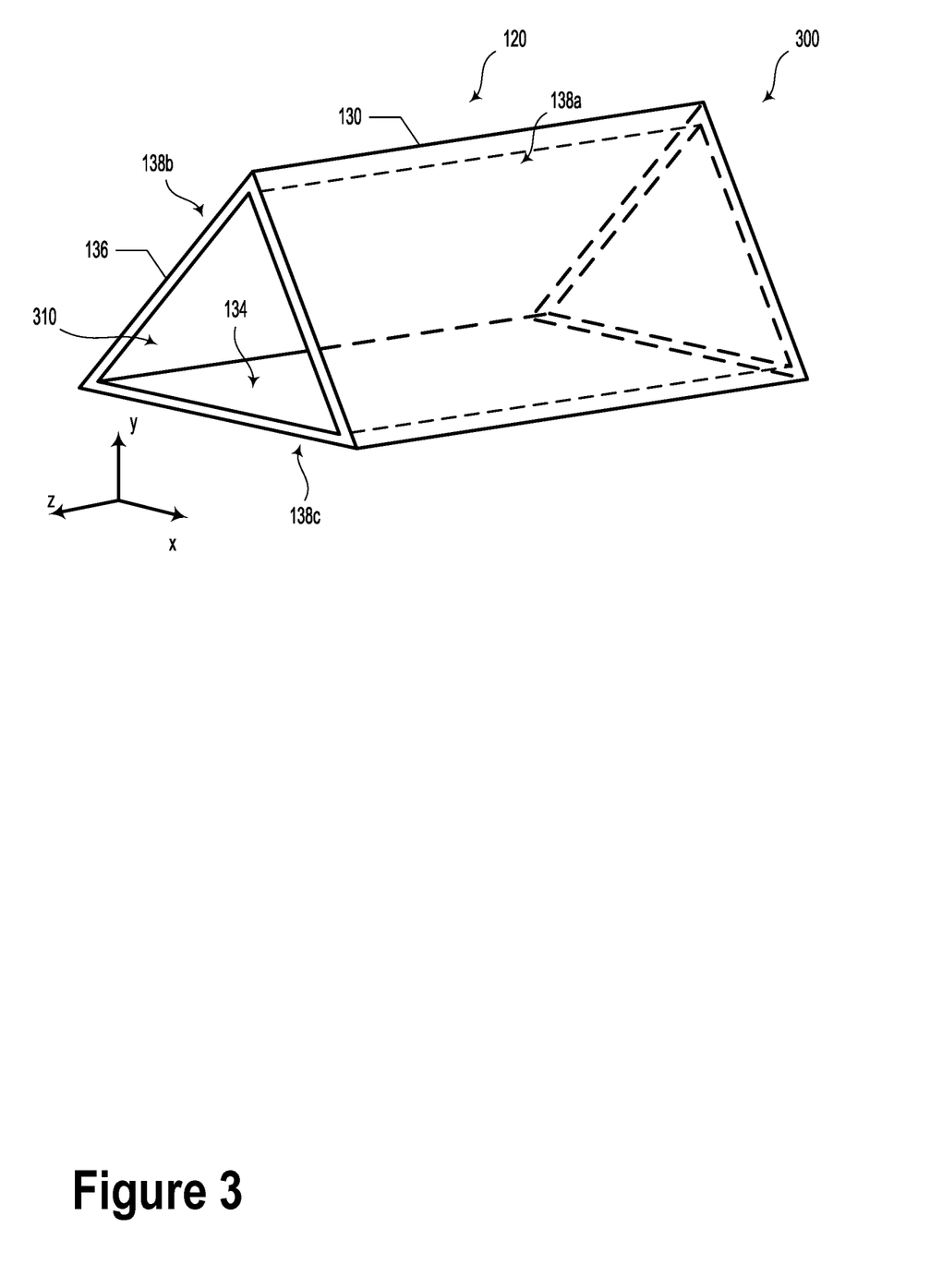
FIG. 3 illustrates a rotatable mirror, according to an example embodiment.

FIG. 3 illustrates a rotatable mirror 300, according to an example embodiment. The rotatable mirror 300 could be similar or identical to rotatable mirror 120, as illustrated and described in reference to FIGS. 1 and 2. For example, as illustrated in FIG. 3, the rotatable mirror 300 could include a multi-sided structure 130 having an exterior surface 136 with three reflective surfaces 138a, 138b, and 138c. Furthermore, the rotatable mirror 300 could include a central cavity 310 defined by an interior surface 134 of the multi-sided structure 130.

While FIG. 3 illustrates the rotatable mirror 300 as being shaped like a triangular prism, other shapes are possible. For example, the rotatable mirror 300 could include four, five, or more reflective surfaces.

Figure 4:
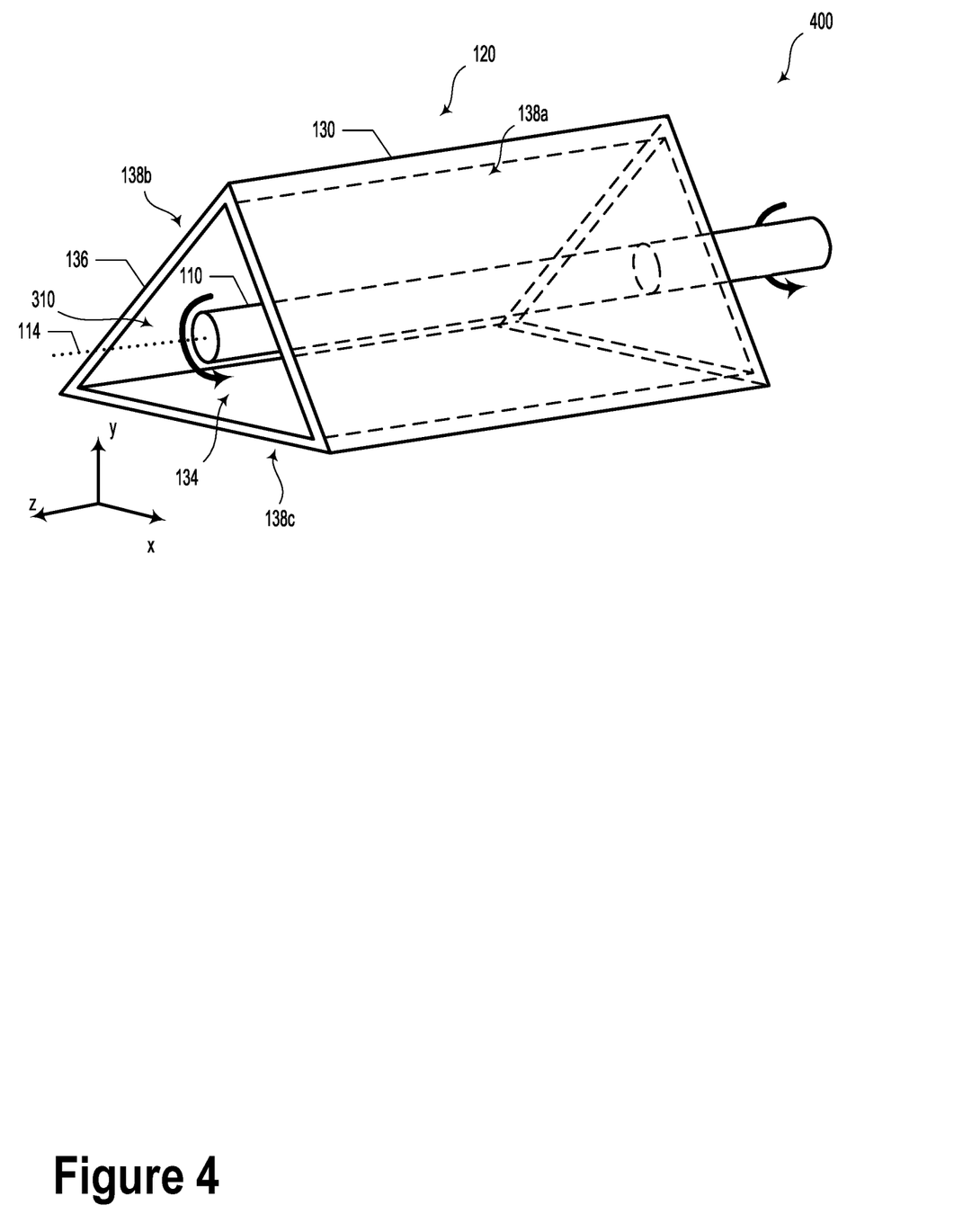
FIG. 4 illustrates a device, according to an example embodiment.

FIG. 4 illustrates a device 400, according to an example embodiment. The device 400 could be similar or identical to device 100, as illustrated and described in reference to FIG. 1. The device 400 could, for example, include rotatable mirror 120. In some embodiments, the rotatable mirror 120 could include a multi-sided structure 130 having an exterior surface 136 with three reflective surfaces 138a, 138b, and 138c. Furthermore, the rotatable mirror 120 could have a central cavity 310 defined by an interior surface 134 of the multi-sided structure 130.

The device 400 includes a shaft 110 that could pass through the central cavity 310 of the multi-sided structure 130. The shaft 110 could be configured to rotate about a rotational axis 114, which could be parallel to the z-axis as illustrated in FIG. 4.

As described herein, the shaft 110 could be connected to the multi-sided structure 130 in various ways. For example, the central cavity 310 could be filled with a material (e.g., epoxy, plastic, etc.) configured to couple the shaft 110 with the multi-sided structure 130. In other embodiments, the shaft 110 could be coupled to the multi-sided structure 130 by way of one or more support members 140, as illustrated and described with reference to FIG. 5.

Figure 5:
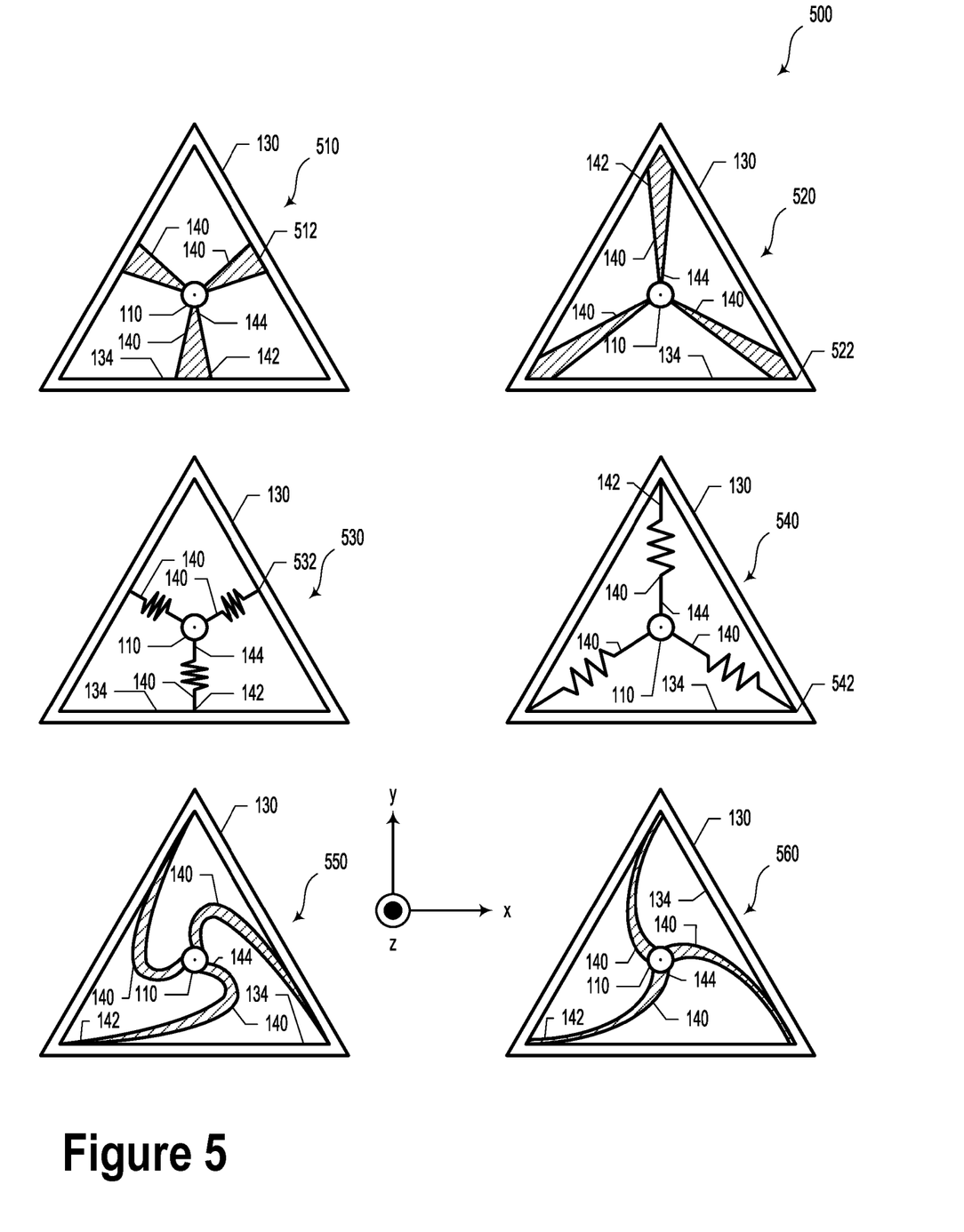
FIG. 5 illustrates axial views of a plurality of rotatable mirrors, according to example embodiments.

FIG. 5 illustrates axial views 500 of a plurality of rotatable mirrors 510, 520, 530, 540, 550, and 560 according to example embodiments. The rotatable mirrors 510, 520, 530, 540, 550, and 560 could be similar or identical to rotatable mirror 120 illustrated and described in reference to FIGS. 1, 2, 3, and 4. In each case described below, the rotatable mirrors 510, 520, 530, 540, 550, and 560 could include support members 140 that may provide better temperature-dependent flatness along the exterior surfaces of the multi-sided structure 130 and the reflective surfaces 138. That is, the support members 140 may provide a greater degree of thermal isolation between the shaft 110, which is formed from a first material 112, and the interior surface 134 of the multi-sided structure 130, which is formed from a second material 132. In such scenarios, the CTE mismatch between steel (approximately 11-12.5×10$^{-6}$/K) and polycarbonate (approximately 65-70×10$^{-6}$/K) may have less impact on the flatness of the reflective surfaces 138 when the shaft 110 and the multi-sided structure 130 are coupled via the support members 140 as opposed to other coupling arrangements. In some embodiments, the support members 140 may flex or cause the multi-sided structure 130 to rotate slightly with respect to the shaft 110 due to the effects of thermal expansion.

In example embodiments, rotatable mirror 510 includes three support members 140 that physically couple the shaft 110 to the interior surface 134 of the multi-sided structure 130. A first end 142 of each of the support members 140 could be coupled to a middle portion 512 of the interior surface 134 of one of the sides of the multi-sided structure 130. Furthermore, a second end 144 could be coupled to the shaft 110. In some embodiments, the support members 140 could be straight. Additionally or alternatively, as illustrated, the support members 140 could be tapered or flared between the first end 142 and the second end 144. For example, the support members 140 could widen in at least one dimension where they couple to the interior surface 134. Likewise, the support members 140 could narrow in at least one dimension where they couple to the shaft 110.

Rotatable mirror 520 could be substantially similar to rotatable mirror 510 in that it may include three support members 140 that physically couple the shaft 110 to the interior surface 134 of the multi-sided structure 130. In the case of rotatable mirror 520, a first end 142 of each of the support members 140 could be coupled to an apex 522 of the interior surface 134 of the multi-sided structure 130. The second end 144 could be coupled to the shaft 110. As illustrated, the support members 140 could be tapered or flared between the first end 142 and the second end 144. For example, the support members 140 could become wider in at least one dimension where they couple to the interior surface 134. Likewise, the support members 140 could be narrower in at least one dimension where they couple to the shaft 110.

As illustrated in FIG. 5, rotatable mirrors 530 and 540 could represent generalized embodiments of rotatable mirrors 510 and 520, respectively. That is, the support members 140 could include elastic, spring-like, and/or bendable structures configured to couple the interior surface 134 of the multi-sided structure 130 to the shaft 110. Furthermore, as illustrated, the support members 140 could couple to middle portions 532 or apexes 542.

Rotatable mirrors 550 and 560 include curved support members 140. In some embodiments, the curved shape may be selected based on a direction of rotation of the shaft 110 and/or the rotational speed of the shaft 110. That is, while support members 140 could be shaped or selected in a particular manner based on a clockwise rotation of the shaft 110 with respect to the +z axis (e.g., "out of the page" as illustrated in FIG. 5), the support members 140 could be shaped or selected different for a counter-clockwise rotation of the shaft 110 with respect to the +z axis. For example, the curved support members 140 could be shaped and/or selected based on a rotational speed (e.g., rotations per minute (RPM)) of the shaft 110 and the multi-sided structure 130.

It will be understood that other types, sizes, shapes, and numbers of support members are possible and contemplated within the scope of the present disclosure.

Figure 6:
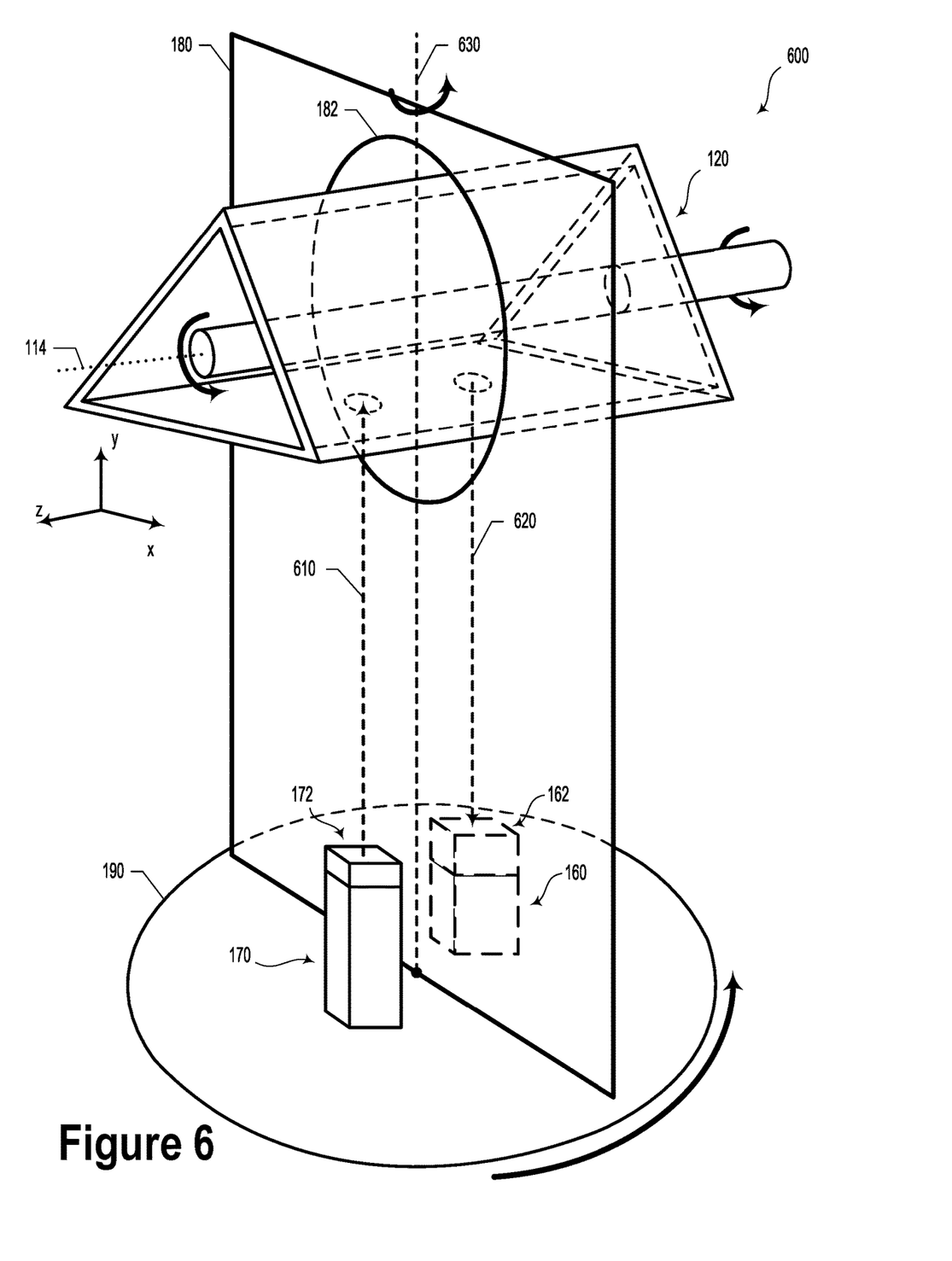
FIG. 6 illustrates a system, according to an example embodiment.

FIG. 6 illustrates a system 600, according to an example embodiment. In some embodiments, system 600 could be similar or identical to system 200, as illustrated and described in reference to FIG. 2. For example, system 600 could be a LIDAR system that includes a rotatable mirror 120. The system 600 may additionally include a base structure 190. The system 600 could also include one or more light-emitter devices 170 and one or more photodetectors 160 that may be coupled to the base structure 190. In some embodiments, the system 600 may include a baffle 180, which may include an opening 182. The rotatable mirror 120 could be configured pass partially through the opening 182. The opening 182 could be shaped to accommodate the rotatable mirror 120 while it is spinning. The baffle 180 could be formed from aluminum, steel, or another rigid material. The baffle 180 could be coated with a non-reflective coating. The baffle 180 could be configured to separate the optical paths corresponding to the light-emitter device(s) 170 and the photodetector(s) 160. In such examples, the baffle 180 could prevent crosstalk and/or optical noise between the transmitting and receiving portions of the LIDAR.

In some embodiments, light 610 emitted by the light-emitter device 170 could be focused, collimated, and/or otherwise modified by a light-emitter lens 172. Furthermore, in some embodiments, light 620 received by the photodetector 160 could be focused, collimated, and/or otherwise modified by a photodetector lens 162 (e.g., a condenser lens).

In some embodiments, the photodetector 160 and an associated optical receiver (not illustrated) may provide information about a scene of the environment around the system 200.

With reference to FIG. 6, the operations of system 200 could include causing the base structure 190 to rotate about a rotational axis 630 (e.g., an axis parallel to the y-axis). The base structure 190 may rotate at rotational frequency Φ. As an example, the base structure 190 may rotate about at a rotational frequency of about 600 RPM. Other rotational frequencies are possible for the base structure 190. For instance, the base structure 190 may rotate at rotational frequencies between 10 RPM and 10 kRPM.

In such a scenario, causing the base structure 190 to rotate about a rotational axis could include utilizing a further actuator to rotate the base structure 190. The further actuator could include a DC motor or another type of rotational actuator.

In some embodiments, causing the light-emitter device 170 to emit light may include causing the light-emitter device 170 to emit laser light pulses based on at least one of rotational frequency Ω or rotational frequency Φ.

Figure 7:
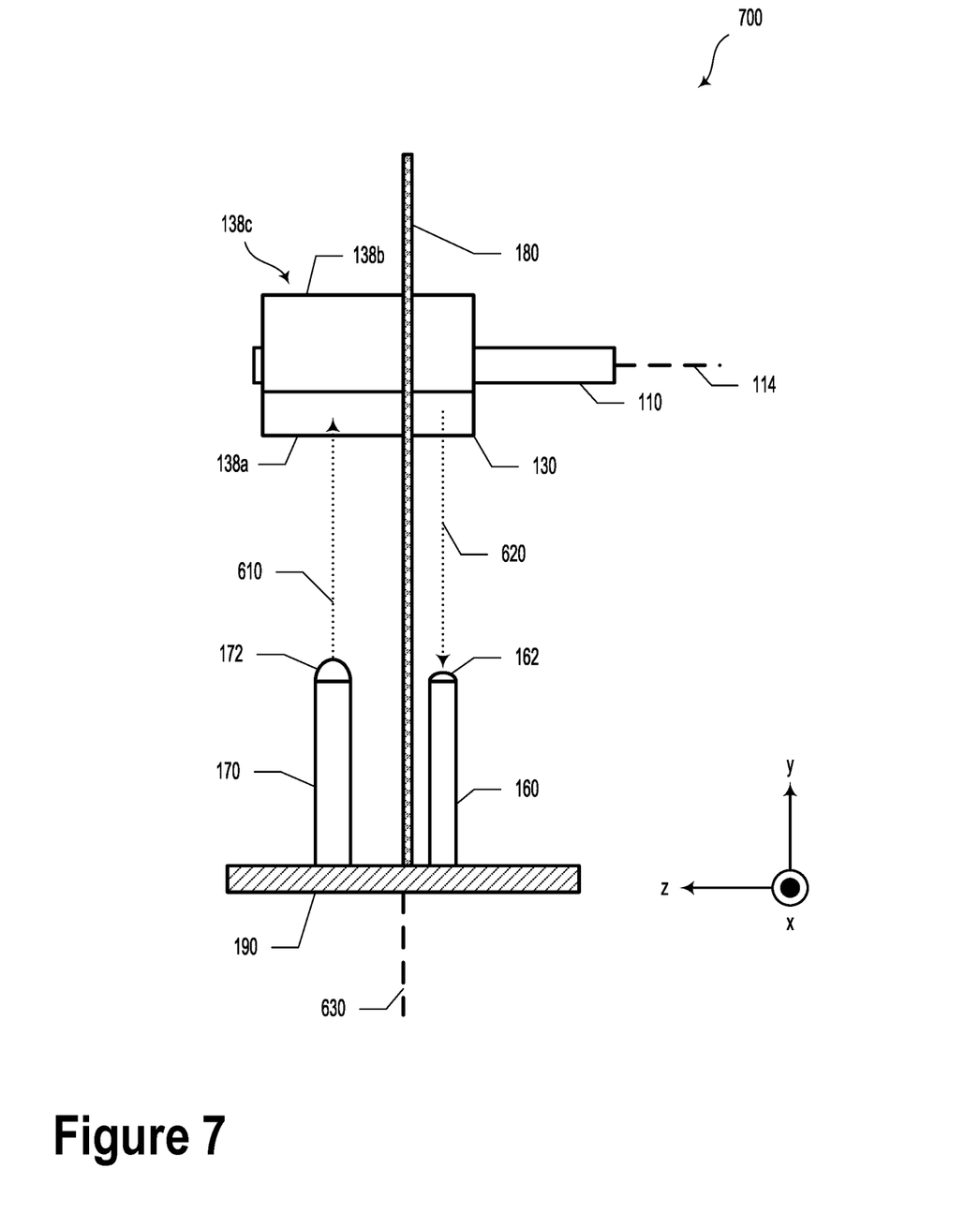
FIG. 7 illustrates a system, according to an example embodiment.

FIG. 7 illustrates a system 700, according to an example embodiment. System 700 could be similar or identical to system 200 and 600, as illustrated and described in reference to FIGS. 2 and 6.

Figure 8:
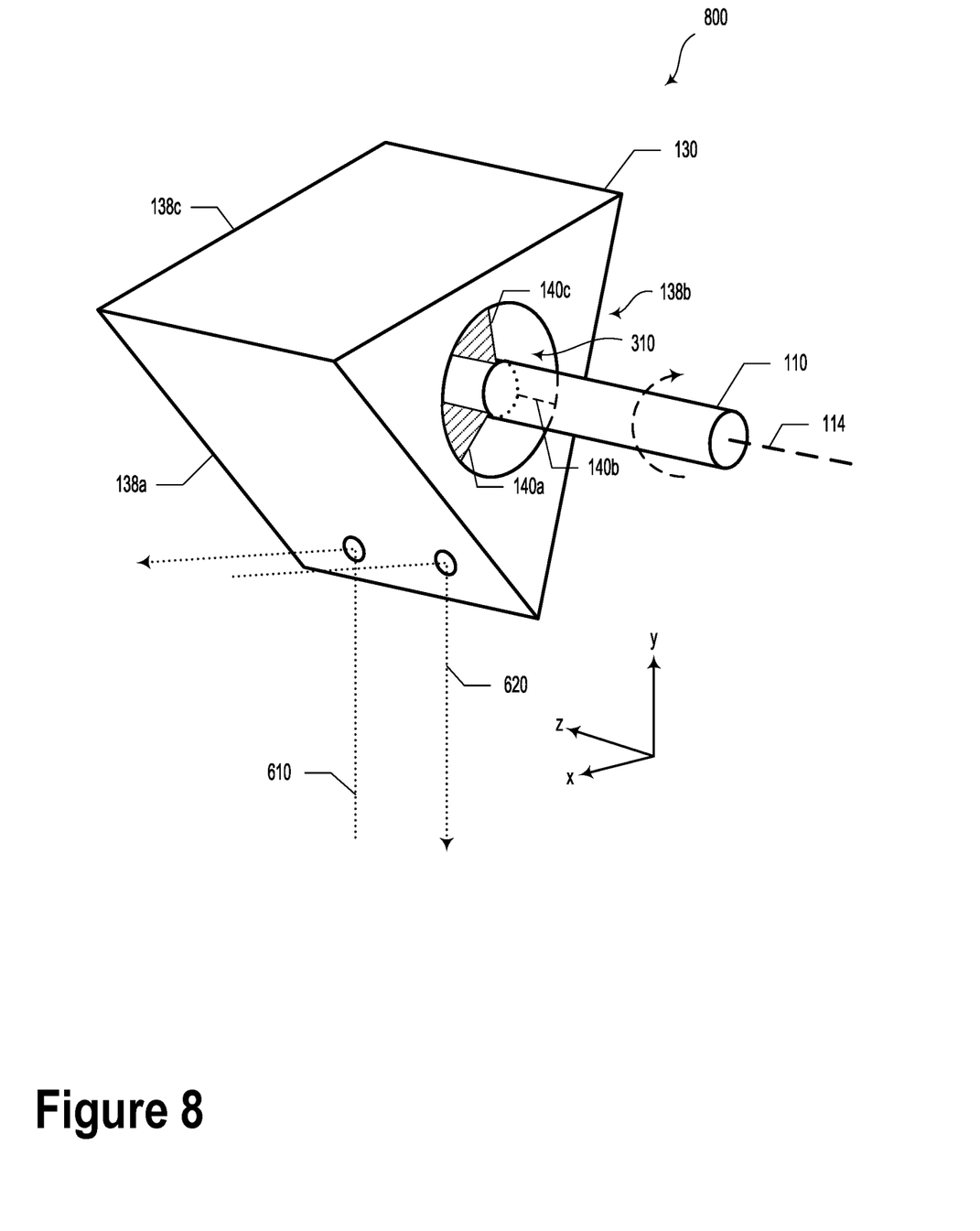
FIG. 8 illustrates a device, according to an example embodiment.

FIG. 8 illustrates a device 800, according to an example embodiment. Device 800 could be similar or identical to device 100, as illustrated and described in FIG. 1. Device 800 includes support members 140a, 140b, and 140c that couple the shaft 110 to the multi-sided structure 130.

Figure 9:
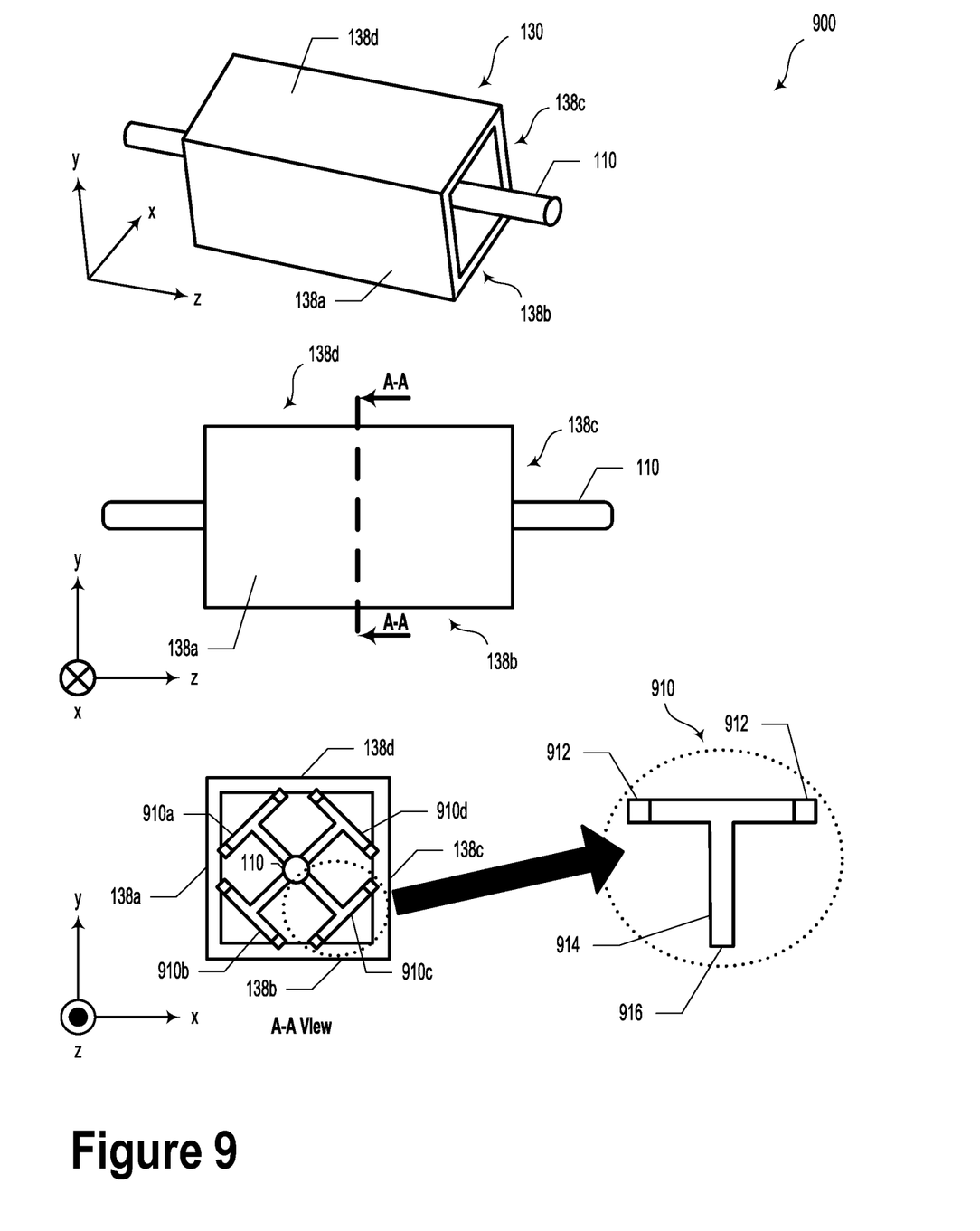
FIG. 9 illustrates a device, according to an example embodiment.

FIG. 9 illustrates several views of a device 900, according to an example embodiment. Device 900 could be similar to device 100, as illustrated and described in FIG. 1. For example, device 900 could include a shaft 110 and a multi-sided structure 130, which could have a plurality of reflective surfaces 138. In some embodiments, the multi-sided structure 130 could be four-sided. For example, as illustrated in FIG. 9, device 900 could include four reflective surfaces 138a, 138b, 138c, and 138d.

As illustrated in the A-A view of FIG. 9, the shaft 110 and the respective reflective surfaces 138a, 138b, 138c, and 138d could be coupled by way of one or more support members 910 (e.g., support members 910a, 910b, 910c, and 910d). In some embodiments, support members 910a, 910b, 910c, and 910d could provide a flexible (e.g., flexural) structural support between the shaft 110 and an interior surface (e.g., interior surface 134 as illustrated and described in relation to FIG. 1).

In example embodiments, the support members 910 could be t-shaped. Additionally or alternatively, the support members 910 could have an elongate t-shape. That is, the t-shape could be extended lengthwise along the z axis. Other shapes are possible and contemplated.

In some embodiments, each support member 910 could include two first ends 912 and a second end 916. The two first ends 912 and the second end 916 could be coupled by way of a t-shaped member 914. As illustrated, the two first ends 912 could couple to two different interior surfaces that correspond to (are located opposite) two different reflective surfaces 138 of the multi-sided structure 130.

In some embodiments, the two first ends 912 could be formed from a first material and the second end 916 could be formed from a second, different, material. As an example, various portions of the support member 910 could be formed from, without limitation, plastic (e.g., polypropylene, polyethylene, polycarbonate, silicone, etc.), rubber (e.g., latex, etc.), metal (e.g., aluminum, steel, titanium, etc.), and/or ceramic. It will be understood that other materials and material combinations are possible and contemplated within the scope of the present disclosure.

In example embodiments, the materials for one or more elements of the support members 910 could be selected so as to reduce or minimize the effect of differences in the coefficient of thermal expansion between, for example, the shaft 110 and the reflective surfaces 138. For example, the two first ends 912 could be selected to be silicone so as to provide a compliant, flexible material that is relatively insensitive to thermal variations. Additionally or alternatively, in some embodiments, the t-shaped member 914 could be formed from a flexible material so as to reduce or minimize the forces upon, or relative displacement of, the reflective surfaces 138 from the shaft 110. Such forces and/or displacement could be due, at least in part, to differences in the coefficient of thermal expansion. Accordingly, by utilizing the disclosed support members 910, device 900 could be less affected by fluctuation in temperature, temperature-dependent material bowing or displacement, and/or long term temperature-cycling effects (e.g., thermal destressing).

In some embodiments, device 900 could be incorporated into system 200 and 600, as illustrated and described in reference to FIGS. 2 and 6.

Figure 10:
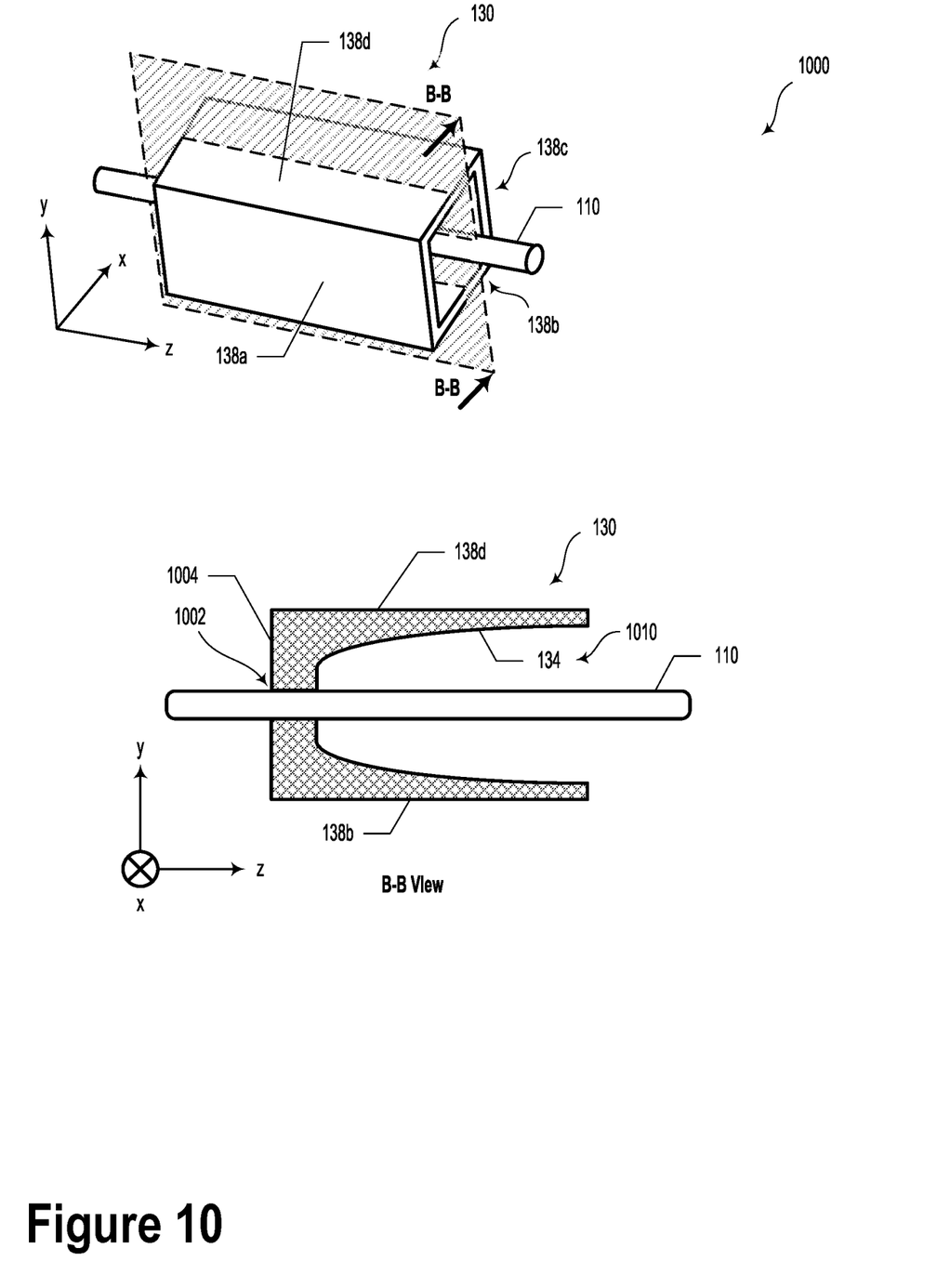
FIG. 10 illustrates a device, according to an example embodiment.

FIG. 10 illustrates several views of a device 1000, according to an example embodiment. Device 1000 could be similar to some aspects of system 600 and device 900, as illustrated and described in reference to FIGS. 6 and 9, respectively. For example, device 1000 could include a multi-sided structure 130 with four major sides defined by reflective surfaces 138a, 138b, 138c, and 138d.

In some embodiments, the body of the mirror could be substantially hollow except for one side, where it may be held by a relatively flexible attachment structure. For example, as illustrated by B-B view, the multi-sided structure 130 could have a hollow interior. For example, a cavity 1010 could be defined by an interior surface 134 of the multi-sided structure 130 and the shaft 110. In some embodiments, multi-sided structure 130 of the device 1000 could be coupled to the shaft 110 by way of a side support 1004. The side support 1004 could provide a relatively flexible structural support for the multi-sided structure 130 and the corresponding reflective surfaces 138a, 138b, 138c, and 138d.

The arrangement illustrated in FIG. 10 could reduce or minimize the amount of displacement of the reflective surfaces 138 due to the CTE mismatch between the materials that form the reflective surfaces 138 and the shaft 110. In such a scenario, some or all of the displacement and/or induced stress due to the CTE mismatch could be limited to a supporting region 1002. The supporting region 1002 could include, for example, an interface between the side support 1004 and the shaft 110. That is, in such embodiments, the CTE-based displacement could occur substantially along a z-axis, which may cause the device 1000 to be less sensitive to temperature excursions or temperature-cycling. Accordingly, the effects on the reflective surfaces 138 due to CTE mismatch could be reduced or minimized in device 1000.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   a shaft defining a rotational axis; and
   a rotatable mirror disposed about the shaft, the rotatable mirror comprising:
   a multi-sided structure comprising a plurality of exterior surfaces and an interior surface, wherein each exterior surface of the plurality of exterior surfaces comprises a respective reflective surface to define a plurality of reflective surfaces; and
   a support member that couples the interior surface of the multi-sided structure to the shaft, wherein the support member comprises a wider portion coupled to the interior surface of the multi-sided structure and a narrower portion between the wider portion and the shaft.

2. The device of claim 1, wherein the shaft comprises a first material having a first coefficient of thermal expansion, wherein the reflective surfaces of the multi-sided structure comprise a second material having a second coefficient of thermal expansion, and wherein the second coefficient of thermal expansion is different than the first coefficient of thermal expansion.

3. The device of claim 2, wherein the support member is configured to accommodate a temperature-dependent material expansion or contraction between the shaft and the reflective surfaces of the multi-sided structure.

4. The device of claim 2, wherein the first material is selected from the group consisting of steel, aluminum, brass, copper, ceramic, and composite materials.

5. The device of claim 2, wherein the second material is selected from the group consisting of aluminum, platinum, and titanium.

6. The device of claim 2, wherein the first material is steel and the second material is aluminum.

7. The device of claim 2, wherein the support member comprises a third material that is different than the first material.

8. The device of claim 7, wherein the third material is selected from the group consisting of plastic, rubber, metal, and ceramic.

9. The device of claim 7, wherein the third material is aluminum.

10. The device of claim 1, wherein the multi-sided structure is a four-sided structure and wherein the plurality of reflective surfaces comprises four reflective surfaces.

11. A system comprising:
    a light-emitter device;
    a photodetector;
    a rotatable mirror disposed about a shaft defining a rotational axis, wherein the rotatable mirror comprises:
    a multi-sided structure comprising a plurality of exterior surfaces and an interior surface, wherein each exterior surface of the plurality of exterior surfaces comprises a respective reflective surface to define a plurality of reflective surfaces; and
    a support member that couples the interior surface of the multi-sided structure to the shaft, wherein the support member comprises a wider portion coupled to the interior surface of the multi-sided structure and a narrower portion between the wider portion and the shaft; and
    a controller that executes instructions so as to carry out operations, the operations comprising:
    causing the rotatable mirror to rotate about the rotational axis; and
    causing the light-emitter device to emit light pulses toward at least one reflective surface of the plurality of reflective surfaces such that at least a portion of the light pulses interact with an external environment so as to form reflected light pulses.

12. The system of claim 11, wherein the operations further comprise:
    based on receiving, with the photodetector, the reflected light pulses from the external environment by way of the at least one reflective surface, determining at least one of: a point cloud, a range, or a distance.

13. The system of claim 11, wherein the shaft comprises a first material having a first coefficient of thermal expansion, wherein the reflective surfaces of the multi-sided structure comprises a second material having a second coefficient of thermal expansion, and wherein the second coefficient of thermal expansion is different than the first coefficient of thermal expansion.

14. The system of claim 13, wherein the support member is configured to accommodate a temperature-dependent material expansion or contraction between the shaft and the reflective surfaces of the multi-sided structure.

15. The system of claim 13, wherein the first material is selected from the group consisting of steel, aluminum, brass, copper, ceramic, and composite materials.

16. The system of claim 13, wherein the second material is selected from the group consisting of aluminum, platinum, and titanium.

17. The system of claim 13, wherein the first material is steel and the second material is aluminum.

18. The system of claim 13, wherein the support member comprises a third material that is different than the first material.

19. The system of claim 18, wherein the third material is selected from the group consisting of plastic, rubber, metal, and ceramic.

20. The system of claim 18, wherein the third material is aluminum.

* * * * *